(12) United States Patent
Peric et al.

(10) Patent No.: US 7,828,014 B2
(45) Date of Patent: Nov. 9, 2010

(54) SELF-RIVETING FLAPPER VALVES

(75) Inventors: Yuri Peric, Oakville (CA); Brian E. Cheadle, Brampton (CA)

(73) Assignee: Dana Canada Corporation, Oakville, Ontario (CA)

( * ) Notice: Subject to any disclaimer, the term of this patent is extended or adjusted under 35 U.S.C. 154(b) by 698 days.

(21) Appl. No.: 11/697,335

(22) Filed: Apr. 6, 2007

(65) Prior Publication Data

US 2007/0240771 A1 Oct. 18, 2007

Related U.S. Application Data

(63) Continuation-in-part of application No. 11/110,434, filed on Apr. 20, 2005, now abandoned.

(51) Int. Cl.
*F16K 15/16* (2006.01)

(52) U.S. Cl. .................. 137/855; 165/280; 165/284; 165/916

(58) Field of Classification Search ......... 137/855–858, 137/15.18, 15.19; 165/280, 283–284, 297, 165/916, 167

See application file for complete search history.

(56) References Cited

U.S. PATENT DOCUMENTS

| 1,690,501 A | 11/1928 | Potts |
| 1,860,163 A | 5/1932 | Wyzenbeek |
| 2,698,063 A | 12/1954 | Brubaker |
| 2,826,448 A | 3/1958 | Jones |
| 3,289,693 A | 12/1966 | Scaramucci |
| 3,568,712 A | 3/1971 | Rinehart |
| 3,621,868 A | 11/1971 | Wise |
| 3,949,716 A | 4/1976 | Liu |
| 3,990,604 A | 11/1976 | Barnett et al. |
| 3,998,243 A | 12/1976 | Osterkorn et al. |
| 3,998,571 A | 12/1976 | Falke |
| 4,179,051 A | 12/1979 | Thomas |
| 4,193,442 A | 3/1980 | Vian |
| 4,199,309 A | 4/1980 | Connor |
| 4,337,737 A | 7/1982 | Pechner |
| 4,360,055 A | 11/1982 | Frost |
| 4,373,561 A | 2/1983 | Berger |
| 4,425,067 A | 1/1984 | Krezak |

(Continued)

FOREIGN PATENT DOCUMENTS

CA 1005319 2/1977

(Continued)

OTHER PUBLICATIONS

International Search Report dated Aug. 3, 2006 issued in PCT case PCT/CA2006/000589.

*Primary Examiner*—Stephen Hepperle
*Assistant Examiner*—Craig M Schneider
(74) *Attorney, Agent, or Firm*—Ridout+Maybee LLP

(57) ABSTRACT

A rivet-type flapper valve assembly for a fluid device has a main body part defining a valve orifice communicating with the fluid device. The main body part includes a pin or shaft of a rivet spaced adjacent to the valve orifice. The main body part is permanently attached to the fluid device, such as by brazing. A flapper valve is then mounted on the rivet shaft to cover the valve orifice, and the rivet shaft is deformed to retain the flapper valve in place.

8 Claims, 9 Drawing Sheets

U.S. PATENT DOCUMENTS

| | | | |
|---|---|---|---|
| 4,471,804 A | 9/1984 | Bauer et al. |
| 4,561,494 A | 12/1985 | Frost |
| 4,669,532 A | 6/1987 | Tejima et al. |
| 4,871,013 A | 10/1989 | Nilsson et al. |
| 5,078,209 A | 1/1992 | Kerkman et al. |
| 5,146,980 A | 9/1992 | Le Gauyer |
| 5,174,504 A | 12/1992 | Halvorsen |
| 5,236,043 A | 8/1993 | Armbruster |
| 5,266,016 A | 11/1993 | Kandpal |
| 5,273,385 A | 12/1993 | Rose et al. |
| 5,351,664 A | 10/1994 | Rotter et al. |
| 5,380,176 A | 1/1995 | Kikuchi et al. |
| 5,411,057 A | 5/1995 | Pouchot |
| 5,499,675 A | 3/1996 | Haasch et al. |
| 5,544,699 A | 8/1996 | Robers et al. |
| 5,558,346 A | 9/1996 | Hartery |
| 5,575,329 A | 11/1996 | So et al. |
| 5,588,485 A | 12/1996 | Gire |
| 5,595,214 A | 1/1997 | Shaffer et al. |
| 5,609,476 A | 3/1997 | Kim et al. |
| 5,765,632 A | 6/1998 | Gire |
| 5,921,273 A | 7/1999 | Ono et al. |
| 5,950,589 A | 9/1999 | Armbruster |
| 6,139,291 A | 10/2000 | Perevozchikov |
| 6,293,774 B1 | 9/2001 | Brabek |
| 6,298,910 B1 | 10/2001 | Komoda et al. |
| 6,358,024 B1 | 3/2002 | Djordjevic |
| 6,382,305 B1 | 5/2002 | Sano |
| 6,412,514 B1 | 7/2002 | Raftis |
| 6,427,768 B2 | 8/2002 | Komoda et al. |
| 6,460,613 B2 | 10/2002 | Nash et al. |
| 6,461,126 B1 | 10/2002 | Pierobon |
| 6,471,490 B2 | 10/2002 | Kimura et al. |
| 6,814,133 B2 | 11/2004 | Yamaguchi |
| 6,942,472 B2 | 9/2005 | Sieberg |
| 7,059,344 B2 * | 6/2006 | Shibamoto et al. ........ 137/512.1 |
| 7,222,641 B2 | 5/2007 | Peric |
| 2003/0019620 A1 | 1/2003 | Pineo et al. |
| 2006/0102240 A1 | 5/2006 | Spiegl et al. |
| 2006/0237077 A1 | 10/2006 | Peric et al. |
| 2006/0237078 A1 | 10/2006 | Luvisotto et al. |
| 2006/0237079 A1 | 10/2006 | Cheadle et al. |
| 2006/0237183 A1 | 10/2006 | Peric et al. |
| 2006/0237184 A1 | 10/2006 | Peric |

FOREIGN PATENT DOCUMENTS

| | | |
|---|---|---|
| CA | 1102210 | 6/1981 |
| CA | 1122968 | 5/1982 |
| GB | 1 545 710 | 5/1979 |
| WO | WO 2005/048890 | 6/2005 |

* cited by examiner

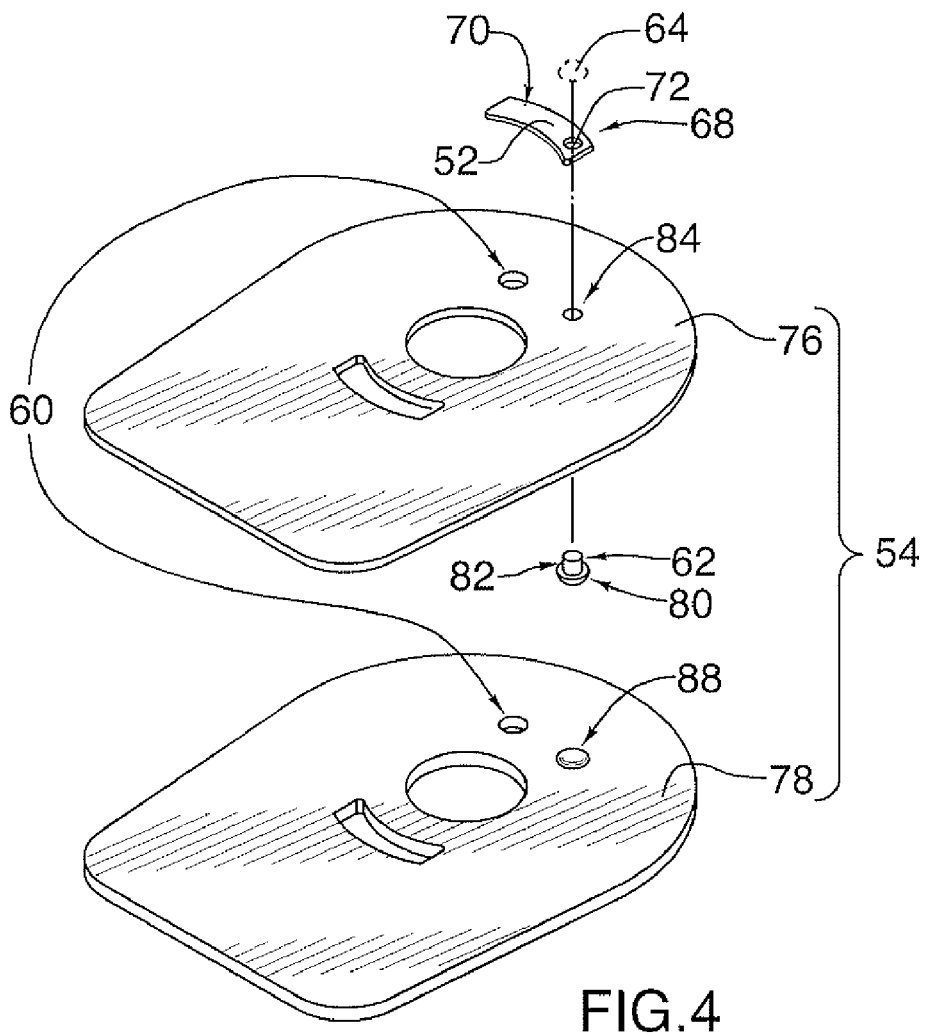
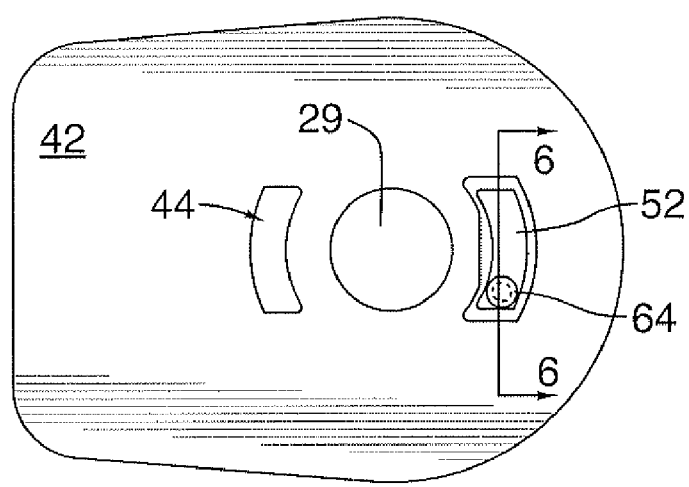
FIG.4
FIG.5

SELF-RIVETING FLAPPER VALVES

This application is a continuation-in-part of U.S. application Ser. No. 11/110,434 filed Apr. 20, 2005, now abandoned, the entire disclosure of which is incorporated herein by reference.

FIELD OF THE INVENTION

This invention relates to valves, and in particular, to flapper valves.

BACKGROUND OF THE INVENTION

Automotive fluids, such as engine oil or transmission fluids, absorb heat in use. To prevent fluid deterioration, this heat often needs to be removed. Heat exchangers are commonly used for this purpose. Moreover, heat exchangers are known to perform this function adequately in moderate ambient conditions. However, in cold ambient conditions, engine oils and transmission fluids can be highly viscous. In such conditions, automotive fluids do not flow easily through heat exchangers. As a result, in such conditions, the interposition of a heat exchanger in an oil circuit can disadvantageously impede circulation. Starvation of some downstream components, like transmissions, may even occur.

In order to avoid these adverse effects, it is known to provide a mechanism for bypassing the heat exchanger. One way that this has been done in the past is to provide a bypass conduit. The bypass conduit is connected in parallel with the heat exchanger and has a relatively low resistance to the flow of high viscosity fluids as compared to the heat exchanger. Structures of this type are known to avoid starvation of downstream components, but can suffer in that, in normal operating conditions, the flow is split between the heat exchanger and the bypass circuit. This requires that the heat exchangers be made proportionately larger and heavier to achieve the same overall heat exchange performance for the cooling system. This added size and weight, and the added costs associated therewith, are undesirable to automotive manufacturers.

To ameliorate the split-flow problem, it is known in the prior art to provide bypass valves. Sometimes, these bypass valves are pressure-activated, and are integrally constructed with or attached to the heat exchanger. A structure exemplary of the foregoing is shown in U.S. Pat. No. 5,236,043 (Armbruster), issued Aug. 17, 1993. This structure includes a flapper valve of spring steel biased in a closed position, to arrest bypass flow, and which is adapted to be urged open when the flow resistance through the normal passage of the heat exchanger is too high as in of cold-start conditions. Heat exchangers of this general type can avoid starvation of downstream lubricated components, and can be adapted such that bypass flow is substantially nil in normal operating conditions, thereby to permit compact heat exchanger construction. However, in Armbruster, connection of the flapper valve to the heat exchanger body is effected by a press-fitted stud. Such construction is difficult to accomplish and suffers from a propensity to leak.

Another type of flapper valve is shown in U.S. Pat. No. 3,998,571 (Falke), issued Dec. 21, 1976, wherein a flapper valve for the cylinder of a reciprocating compressor is shown. This flapper valve is part of a flapper sub-assembly having a flapper mounting portion riveted in place. However, the rivet construction also has a propensity for leakage, and the riveted sub-assembly requires separate handling and increases the cost and complexity of the device.

SUMMARY OF THE INVENTION

In the present invention, a rivet-type flapper valve assembly is provided where a main body pair includes a pin portion of the rivet. The main body part is permanently attached to any heat exchanger or other fluid device. A flapper valve is then located on the pin portion which is easily deformed to complete the flapper valve assembly.

A flapper valve assembly forms one aspect of the invention. The assembly is for controlling fluid flow from a flow chamber of a fluid device and comprises a main body part and a flapper valve. The main body part includes: a first plate operatively permanently secured to the fluid device and having a valve orifice extending therethrough communicating with the flow chamber; and a transverse pin spaced from the valve orifice and extending from the first plate to an enlarged upper head part. The pin is secured to the first plate in a manner such that an unbroken sealing surface of the main body part seals the flow chamber but for said valve orifice. The flapper valve is flexible and has: a mounting end portion defining a hole through which the pin extends, the flapper valve being retained in position against the first plate by the upper enlarged head part; a free end portion movable from a first position where the free end portion at least partially blocks flow through the valve orifice, to a second position spaced from the valve orifice; and bias means for urging the free end portion into the first position.

According to one aspect, the first plate can have a bore through which the pin extends and is permanently secured to the fluid device by an intermediate second plate which defines the sealing surface and upon which the first plate is disposed in stacked, sealed relation; and the pin can have an enlarged lower head part which is mechanically captured in a recess defined between the first plate and the second plate.

According to another aspect, the pin and the first plate can be integrally formed of a single piece of material winch is permanently secured to the fluid device by an intermediate second plate which defines the sealing surface.

A heat exchanger forms another aspect of the invention. The heat exchanger comprises a heat exchange element, a main body part and a flapper valve. The heat exchange element includes an inlet manifold and an outlet manifold. The main body part includes: a first plate operatively permanently secured to the heat exchange element and having extending therethrough a valve orifice communicating with one of the inlet manifold and the outlet manifold; and a transverse pin spaced from the valve orifice and extending from the first plate to an enlarged upper head part. The pin is secured to the first plate in a manner such that an unbroken sealing surface of the main body part seals said one manifold but for said valve orifice. The flapper valve is flexible and has: a mounting end portion defining a hole through which the pin extends, the flapper valve being retained in position against the first plate by the enlarged upper head part; a free end portion movable from a first position, where the free end portion at least partially blocks flow through the valve orifice, to a second position spaced from the valve orifice; and bias means for urging the free end portion into the first position.

A method of attaching a flapper valve to a fluid device having a flow chamber forms another aspect of the invention. In the method there is provided a first plate and a transverse pin, the first plate having extending therethrough a valve orifice. The first plate and the pin are permanently secured to the fluid device: to define, at least in part, a main body part; such that the valve orifice is in communication with the flow chamber; such that the transverse pin is spaced from the valve orifice and extends from the first plate; and such that an unbroken sealing surface of said main body part seals said flow chamber but for said valve orifice. A resilient flapper valve is mounted onto the pin such that the pin extends through the flapper valve, and the pin is deformed to secure the flapper valve in place.

According to one aspect, in the method, the pin and the first plate can be integrally formed of a single piece of material which defines the sealing surface.

According to another aspect, the pin and the first plate can be integrally formed of a single piece of material which is permanently secured to the heat exchange element by an intermediate second plate which defines the sealing surface and upon which the first plate is disposed in stacked, sealed relation.

According to yet another aspect, the first plate can have a bore through which the pin extends and be permanently secured to the heat exchange element by an intermediate second plate which defines the sealing surface and upon which the first plate is disposed in stacked, sealed relation; and the pin can have an enlarged lower head part which is mechanically captured between the first plate and the second plate.

In the method, the first plate and the pin can be permanently secured to the fluid device by brazing, prior to the step of mounting the resilient flapper valve.

BRIEF DESCRIPTION OF THE DRAWINGS

In the accompanying drawings, which are for the purpose of illustration and description only, and are not intended as a definition of the limits of the invention:

FIG. 4 is an exploded view of the structure in encircled area 4 in FIG. 3;

FIG. 5 is a top plan view of the structure in encircled area 3 in FIG. 2;

DESCRIPTION OF THE PREFERRED EMBODIMENTS

Figure 1:
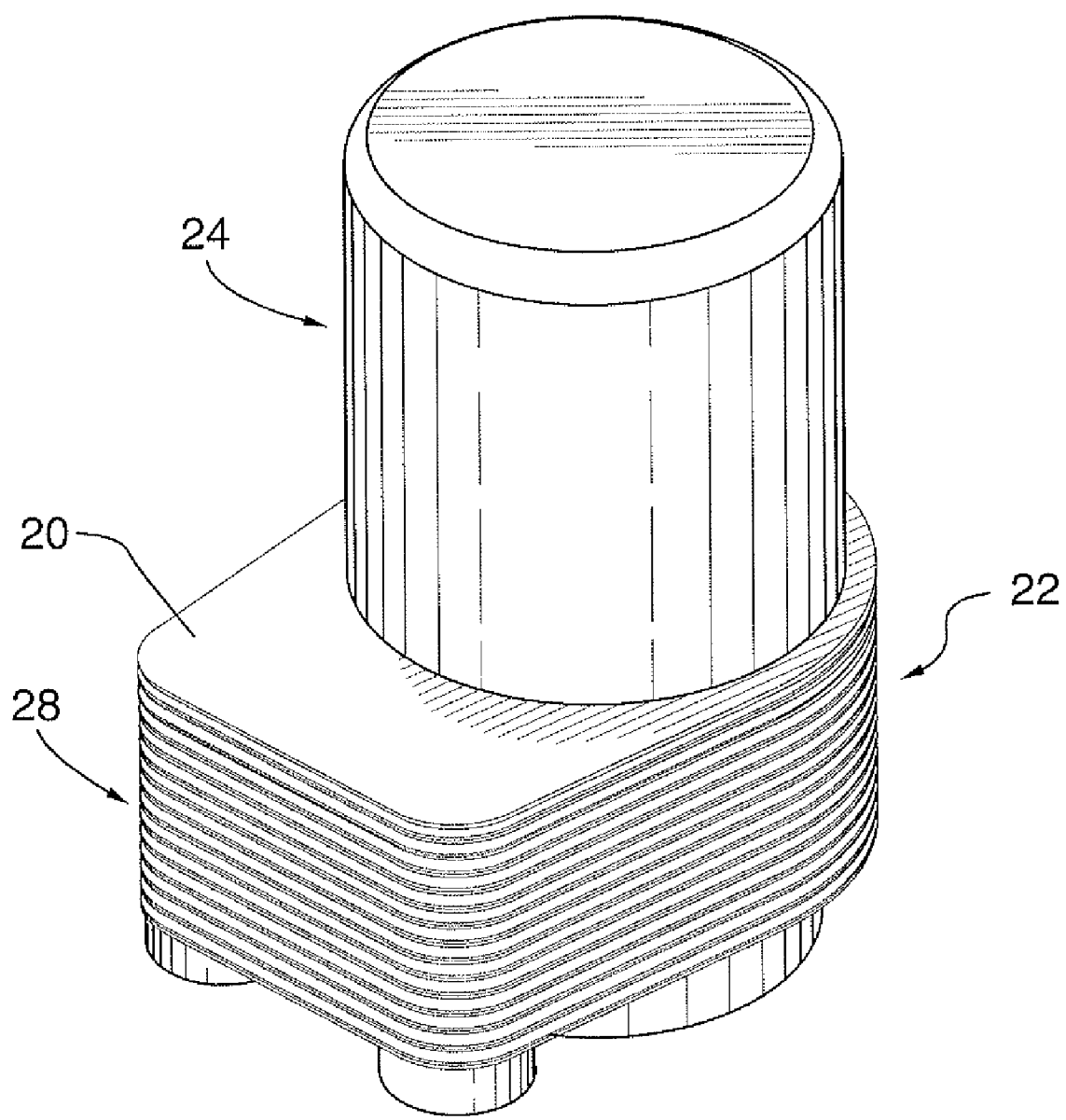
FIG. 1 is a perspective view of an assembly including a heat exchanger and a spin-on oil filter, the heat exchanger including a preferred embodiment of a flapper valve assembly according to the present invention.

FIG. 1 shows a heat exchanger 22 having a spin-on oil filter 24 or similar fluid device mounted thereon. Heat exchanger 22 includes a flapper valve assembly 20 according to a preferred embodiment of the present invention, and a heat exchange element 28. Heat exchanger 22 preferably is in the form of a donut-type oil cooler, but it could be any other type of heat exchanger or any other type of fluid device. For the purposes of the present specification, the exact form of the heat exchange element 28 and the spin-on oil filter 24 are not considered to be part of the present invention.

Figure 2:
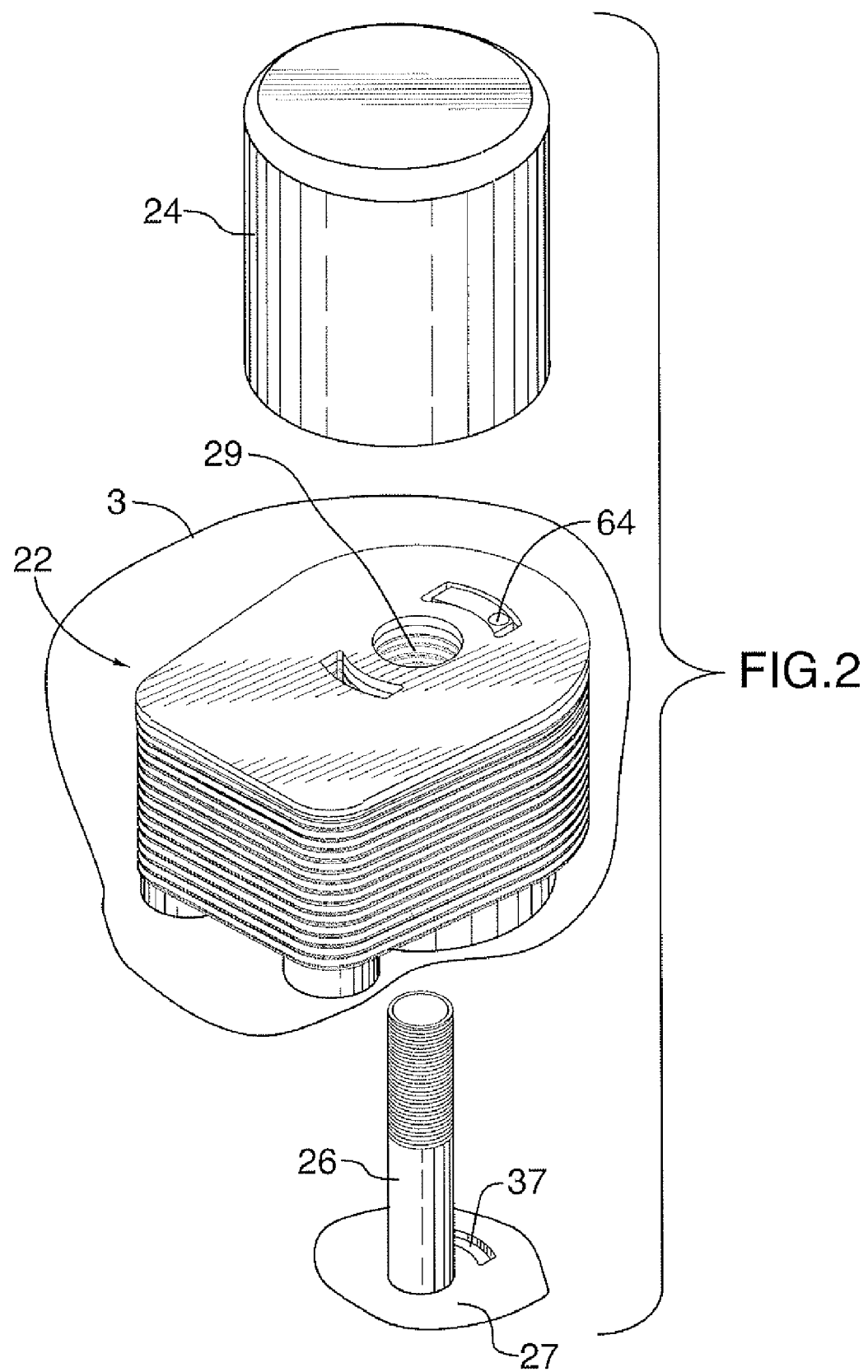
FIG. 2 is an exploded perspective view of the structure of FIG. 1 about to be mounted on an engine block.

The heat exchanger or donut cooler 22 is for use with a coolant circuit and lubrication or other fluid circuit and, by way of example, as indicated in FIG. 2, is mounted on a threaded pipe 26 attached to an engine block 27 (only partially shown in FIG. 2). Threaded pipe 26 extends through a clearance or hole 29 in heat exchanger 22 to permit the subsequent threaded attachment of the oil filter 24 onto pipe 26, as indicated in FIG. 1, and also to hold heat exchanger 22 in place on engine block 27.

Figure 3:
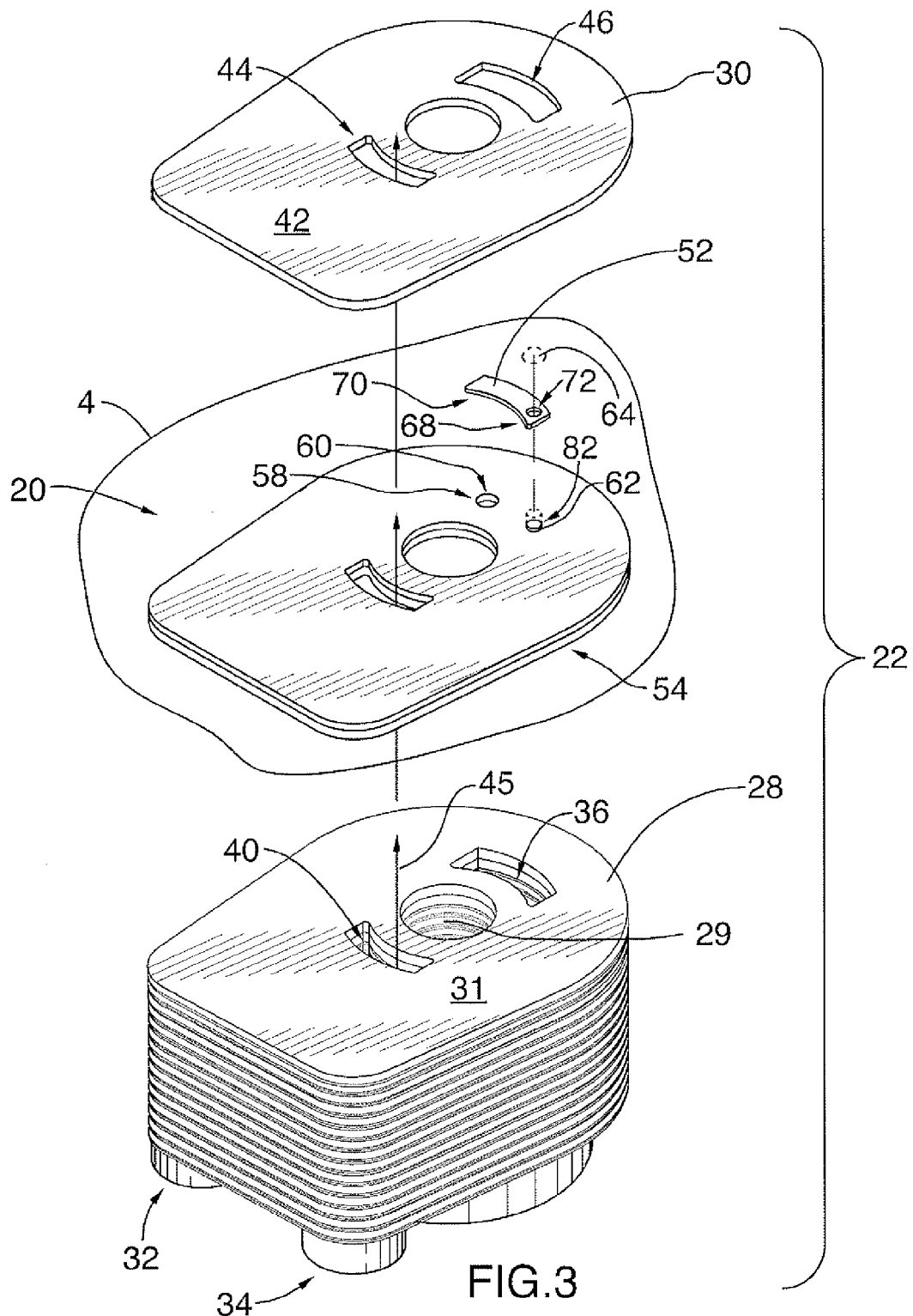
FIG. 3 is an exploded view of the structure in encircled area 3 in FIG. 2.

As best seen in FIG. 3, heat exchanger 22 includes a heat exchange element 28 having an end plate 31, a top face plate 30, and an intermediate flapper valve assembly 20 located therebetween. Heat exchange element 28 is of the stacked-plate type and has a coolant inlet 32 and a coolant outlet 34. Heat exchange element 28 is formed of a plurality of aluminum plates brazed together. Each plate has spaced-apart, arcuate openings therein, which are aligned to form respective flow passages or chambers or manifolds 36, 40. One of these manifolds can be an inlet manifold, for example, manifold 36. The other of them can be an outlet manifold 40, but this could be reversed.

Where manifold 36 is the inlet manifold, oil is received into the manifold 36 through an aperture 37 (see FIG. 2) formed in engine block 27. This oil passes through heat exchange element 28 to outlet manifold 40, and then passes upwardly into oil filter 24, and finally down through pipe 26 to be returned to engine block 27. However, where this flow is reversed, it comes up through pipe 26 to filter 24, and then passes into manifold 40, through heat exchange element 28 to manifold 36, and then back through aperture 37 to be returned to the engine.

It should be understood that the heat exchange element 28 is of generally conventional construction, and therefore, only those parts necessary for an understanding of the present invention are shown in the figures and described herein.

Upon a flow of heated oil being forced into the inlet manifold 36 and a flow of coolant being delivered to the coolant inlet 32, a flow of cooled oil is produced at the outlet manifold 40 and a flow of heated coolant is produced at the coolant outlet 34. Again, this flow could be reversed.

The face plate 30 has a sealing surface 42 and a pair of openings 44,46. The sealing surface 42 is adapted to be engaged by the filter 24. The pair of openings 44,46 communicate with an annular channel (not shown) in the base of the oil filter 24. One of this pair of openings 44,46 is in fluid communication with the outlet manifold 40 for receiving the flow of cooled oil, as indicated by arrow 45 in FIG. 3. The other opening 46 permits by-pass flow to oil filter 24, as described further below.

Figure 6:
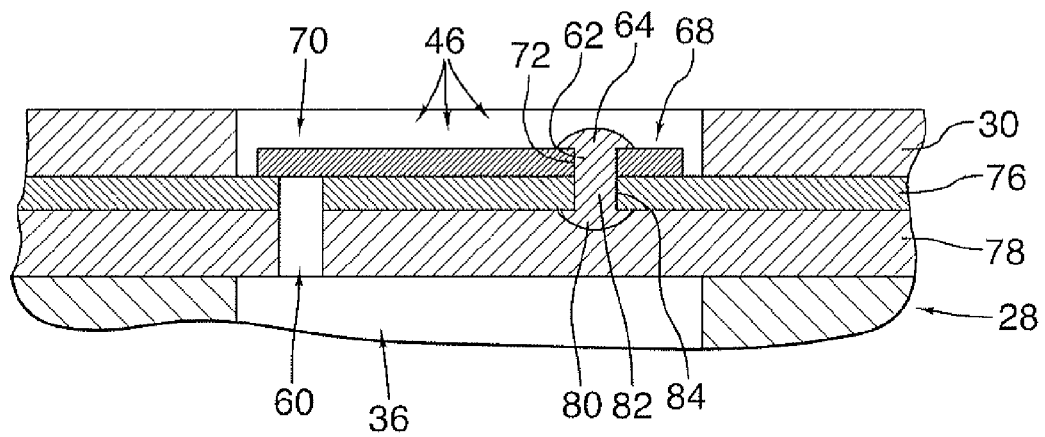
FIG. 6 is a partial cross-sectional view taken along lines 6-6 of FIG. 5, with the free end portion of the flapper valve shown in a closed position.

Turning now to the flapper valve assembly 20, same will be seen to comprise a main body pair or flapper support structure 54, and a resilient flapper valve 52, the latter being constructed of spring steel. The flapper support structure 54 is disposed between and secured to each of the heat exchange element 28 and the face plate 30 and has a fluid part portion 58 defining a passage or valve orifice 60 for communication between the inlet manifold 36 and face plate opening 46. For clarity, the fluid port portion 58 should be understood to be a portion of the main support structure 54 immediately surrounding the valve orifice 60 and overlying the manifold 36. As best seen in FIG. 6, the main body part 54 defines all unbroken sealing surface 100, i.e. a surface lacking through-passing rivets or fasteners, etc. that seals the manifold 36 but for the valve orifice 60. The absence of through-passing fasteners, etc., renders leakage relatively unlikely.

Figure 8:
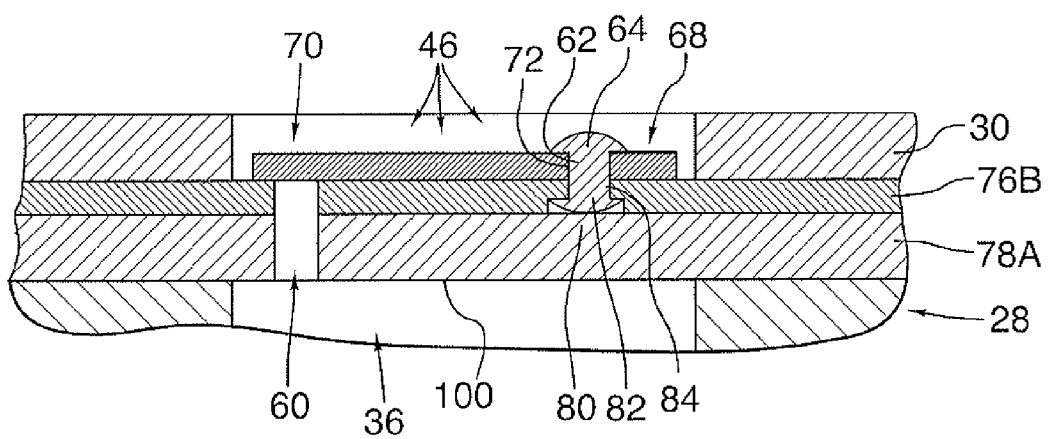
FIG. 8 is a view similar to FIG. 6, but showing the recess for the rivet first head part being located in the first plate.
Figure 9:
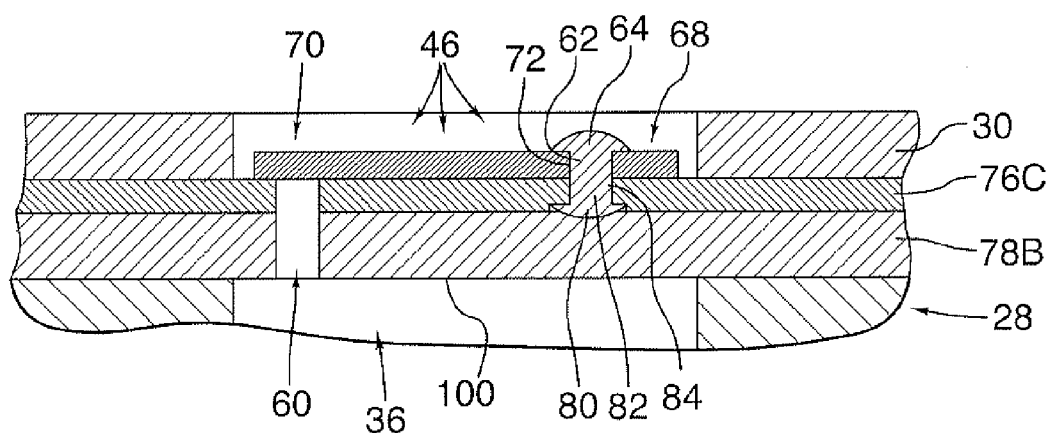
FIG. 9 is a view similar to FIG. 6, but showing the recess for the rivet first head part being formed partially in both the first and second plates.

As seen best in FIG. 4, the flapper support structure 54 comprises a pair of plates 76,78 disposed in stacked, sealed relation. A first plate 76 is formed of a plain aluminum alloy, and a second plate 78 is formed of brazing clad aluminum. A rivet or pin 62 has a first lower head part 80 and a pin or shaft 82 extending through a bore 84 formed in plate 76. Plate 78 has a recess 88 communicating with bore 84 and dimensioned to receive the first head part 80 of rivet 62, so that the rivet 62 is trapped or captured by the pair of plates 76, 78. However, recess 88 could be formed as a counterbore on the underside of a modified first plate 76B, beneath bore 84 (see FIG. 8), with a modified second plate 78A being a flat plate to trap and retain rivet 62 in place. Recess 88 could also be formed partially in modified first and second plates 76C,78B, as seen in FIG. 9. In FIG. 6, second plate 78 defines the sealing surface 100.

The flapper valve 52 has a mounting end portion 68 and a free end portion 70. The mounting end portion 68 has a hole 72 dimensioned to receive the rivet shaft 82. At the operative position, the mounting end portion 68 abuts the top surface of main body part or support structure 54.

FIG. 5 shows that opening 46 could be enlarged, such as by having a chord portion 47. This would provide more space for release of oil flow and reduce pressure drop when flapper valve 52 is open and permitting bypass flow.

Figure 7:
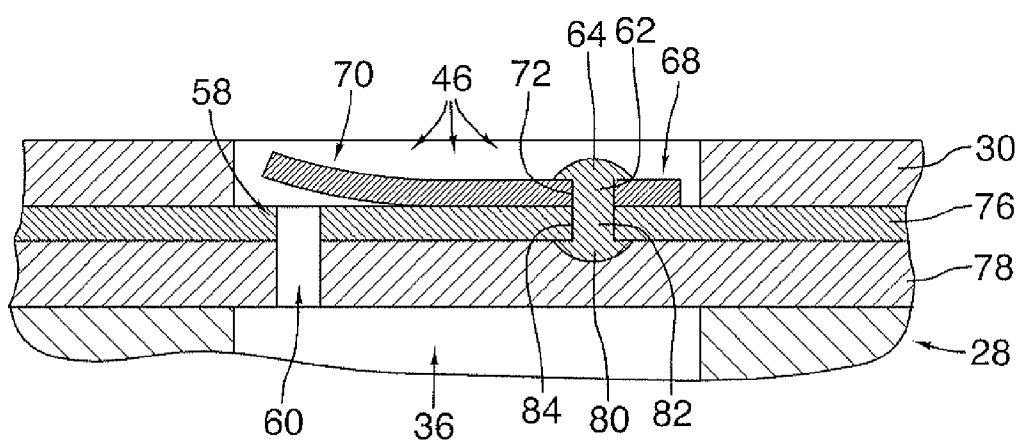
FIG. 7 is a view similar to FIG. 6, with the free end portion of the flapper valve shown in an open position.

As best seen in FIGS. 6 and 7, the upper distal end of pin 62 is peered over or deformed into a second upper head pair 64. In FIG. 3, to better illustrate the manner in which the various parts are arranged, the second head pat 64 is illustrated in phantom apart from the pin 62, but the pin 62 and second head part 64 are actually formed integrally, out of a single piece of material, as indicated in FIGS. 6 and 7. The flapper valve 52 is thus retained or captured by rivet 62, as opposed to a fastener, such as a screw or bolt. The free end portion 70 of flapper valve 52 is movable, by flexure, between a first or closed position abutting the fluid port portion 58 in overlying relation to or covering the valve orifice 60, as shown in FIG. 6, and a second or open position spaced above the valve orifice 60, as shown in FIG. 7. The dimensions of the free end portion 70 are such that, when disposed at its first or closed position, flow through the passage 60 is restricted, and more specifically, substantially arrested. However, free end portion 70 could be dimensioned to only partially close valve orifice 60 where some permanent bypass flow is desired.

FIGS. 6 to 7 also illustrate that the thickness of face plate 30 allows flapper valve 52 to be recessed or hidden inside opening 46, even when the flapper valve is open. This provides a clean or flat surface 42 for mounting components, such as filter 24, or for attaching heat exchanger 22 to other objects, like an engine. This also protects the flapper valve during transportation and assembly of heat exchanger 22 to other components. However, a face plate 30 is not necessary, nor is the flat surface 42 thereof.

In normal operating conditions, wherein relatively warm, substantially free-flowing oil is delivered to the inlet manifold 36, bias provided by the spring steel flapper valve 52, specifically, the mounting end portion 68 thereof, maintains the free end portion 70 of the flapper valve 52 against the fluid port portion 58 to restrict or arrest flow through the valve orifice 60. Thus, most of the flow arriving at the inlet manifold 36 passes in heat exchanging relation through the heat exchange element 28 to the outlet manifold 40, transferring heat to the coolant in heat exchange element 28 in the process. The oil then passes through outlet or opening 44 in the face plate 30 to the oil filter 24, for filtering, and subsequent return to the oil circuit in a conventional manner.

In contrast, in conditions such as are present in the context of an engine start in relatively cold ambient conditions, wherein the oil is relatively cold and viscous, the pressure resistance between the inlet manifold 36 and outlet manifold 40 is relatively large, with the result that the viscous oil forces the free end portion 70 of the flapper valve 52 apart from the fluid port portion 58, as indicated by the sequence of FIGS. 6, 7, such that oil flow passes from the inlet manifold 36 through valve orifice 60 and opening 46 directly to the filter 24. Periodic, momentary pressure spikes or burst flows in the oil circuit also bypass the heat exchange element 28 in this manner.

The mechanical properties of the flapper valve 52 are selected to suit the operating parameters of the heat exchange element and lubrication circuit with which it is used, as will be appreciated by persons of ordinary skill in the art.

The foregoing structure is of particular advantage, in that it obtains relatively high cooling performance in normal operating conditions, when cooling is needed, as substantially all oil passes through the heat exchange element to transfer heat to the coolant in such conditions. At the same time, the structure avoids starvation of mechanical components in normal transient high pressure conditions, such as cold weather startup, and also avoids metal fatigue that can result from pressure spikes in the thin-wall plates forming the heat exchange element, since in such conditions bypass flow occurs.

In the assembly of heat exchanger 22, the flapper support structure 54 is permanently attached to the heat exchange element or other fluid device 28 with the valve orifice 60 in communication with the flow chamber from which it is desired to control fluid flow. The rivet or pin 62 extends transversely from support structure 54. Flapper support structure 54 is permanently attached to fluid device 28, preferably by brazing, and preferably at the same time as the components of fluid device 28 are brazed together, but flapper structure 54 could be attached in other ways. Thereafter, the mounting end portion 68 of the flapper valve 52 is put into its operative position. That is, the end of the flapper valve 52 with the hole 72 therein is put on rivet 62 in abutment with the main body part 54. Thereafter, the head 64 of rivet 62 is deformed or "upset", typically with an impact device, to retain flapper valve 52 in place. The head can also be deformed by ultrasonic or rotating forming devices, with or without the assistance of heat.

Figure 6A:
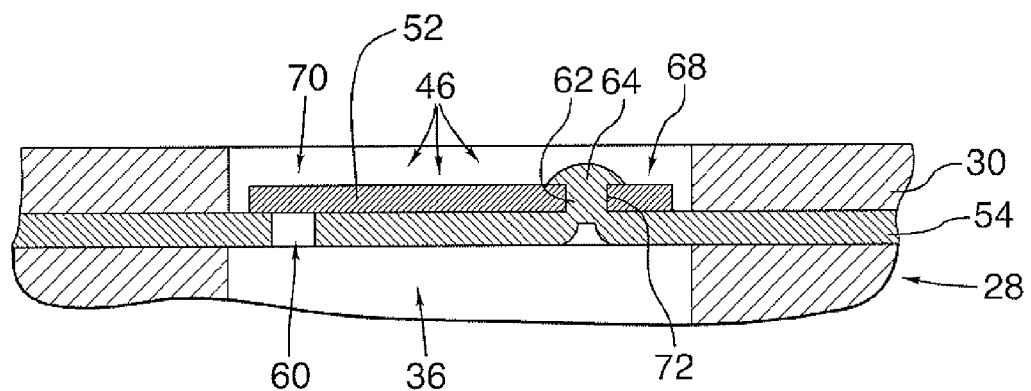
FIG. 6A is a view similar to FIG. 6, but of a further preferred embodiment of the invention, with the free end portion of the flapper valve shown in a closed position.
Figure 7A:
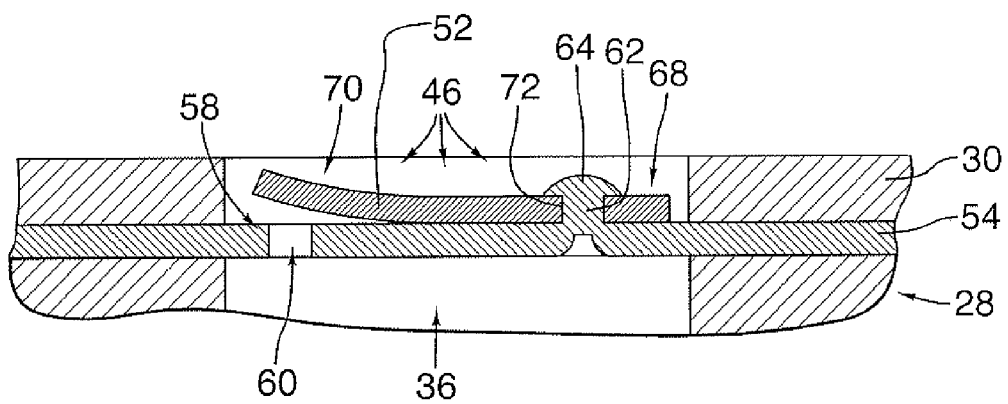
FIG. 7A is a view similar to FIG. 7, but of the embodiment shown in FIG. 6A, again with the free end portion of the flapper valve shown in an open position.

Referring next to FIGS. 6A and 7A, another preferred embodiment is shown in which the main body part or flapper support structure is constructed with the first plate and the pin or rivet 62 formed integrally (without head 80), preferably out of single piece of aluminum sheet material 76A. Plate 76A is disposed in stacked relation between the face plate 30 and the heat exchange element 28. Thereafter, the assembly is exposed to a brazing operation, as generally described above, to secure support structure 54 to fluid device 28. After that, the flapper valve 52 is operatively positioned on rivet 62 and the head 64 of pin or rivet 62 is deformed to retain flapper valve 52 in place. In FIGS. 6A, 7A, first plate 76A defines the sealing surface 100.

Figure 10:
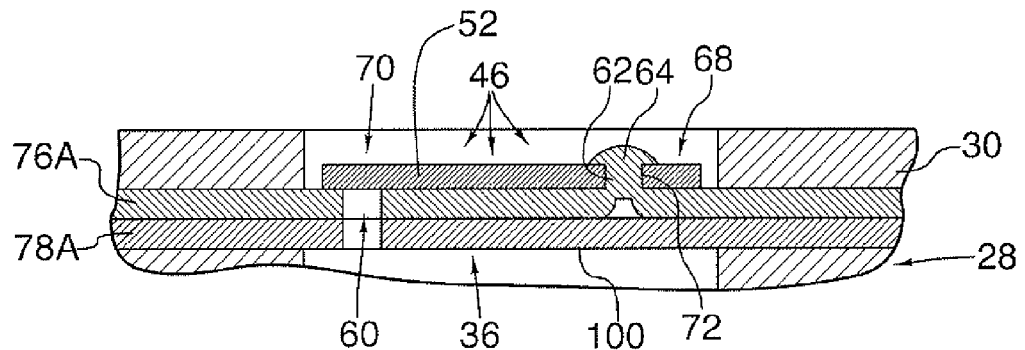
FIG. 10 is a view similar to FIG. 6A, but showing an intermediate second plate backing up the first plate.
Figure 11:
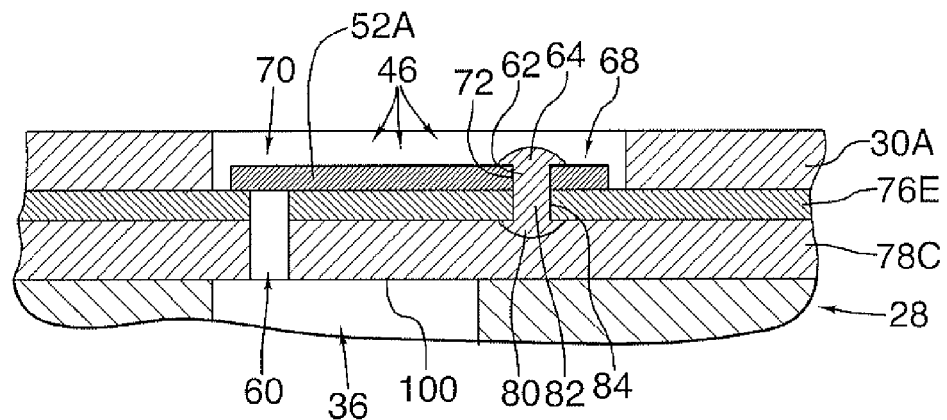
FIG. 11 is a view similar to FIG. 6, but showing the opening in which the flapper is positioned and the flapper enlarged, such that the rivet structure overlies the structure of the heat exchanger.
Figure 12:
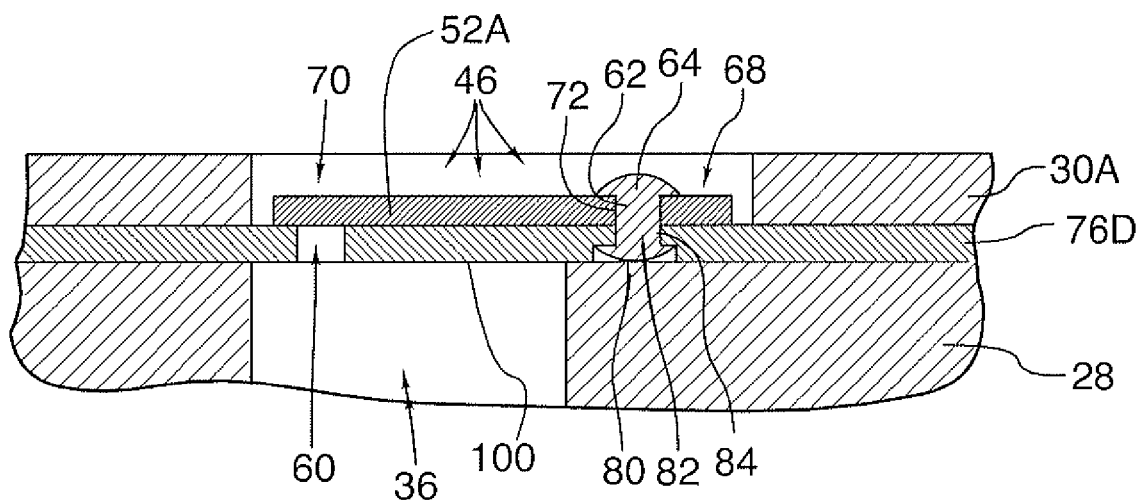
FIG. 12 is a view similar to FIG. 8, but showing the opening in which the flapper is positioned and the flapper enlarged, such that the rivet structure overlies the structure of the heat exchanger.

FIG. 10 shows another embodiment similar to the embodiment of FIG. 6A, but in this embodiment, the modified first plate 76A is permanently secured to the heat exchange element 28 by an intermediate modified second plate 78A upon which the first plate is disposed in stacked, sealed relation and which defines the sealing surface 100. FIG. 11 shows an embodiment similar to FIG. 6, but with modified versions of the first plate 76E, second plate 78C and face plate 30A, and a lengthened flapper 52A, such that the rivet structure overlies the structure of the heat exchange element 28. FIG. 12 shows another embodiment, this time similar to FIG. 8, with lithe first plate 76D and flapper 52A being modified similarly to FIG. 11, so that the rivet structure overlies the structure of the heat exchange element 28. The additional structure beneath the rivet in each of FIGS. 6,7 and 8-12 may be of advantage when "upsetting" the rivet to deform the upper head.

Having described preferred embodiments of the present invention, it will be appreciated that various modifications may be made to the structures described above without departing from the spirit or scope of the invention.

Foremost, whereas the flapper valve assemblies described herein are shown in use with a heat exchanger, it should be understood that the invention is not so limited, and may be deployed in association with any fluid device having a flow chamber from which intermittent flow is desired.

Where the fluid device is a heat exchanger, different types of heat exchangers are also contemplated to fall within the scope of the invention. Heat exchangers, for example, that are not of the donut type may be utilized. As well, the heat exchangers need not be formed of stacked plates, nor is it required that the various components be brazed to one another. As well, the face plate 30 is not required; the main body part itself could be configured to mate with the oil filter or any other fluid device. Further, it should be understood that in this disclosure and in the appended claims, "heat exchange element" is merely a structure having some heat exchange functionality, and is not limited to a fully-functional heat exchanger. For example, but without limitation, the heat exchange element may not constitute a complete heat exchanger until such time as the second plate or first plate is secured thereto. That is, the second plate or the first plate may, in addition to serving as the main body part of the valve assembly, define part of the flow passages leading between the manifolds in the completed heat exchanger.

As a further modification, whereas the flapper valve of the preferred embodiment consists of a strip of simple spring steel, a resilient bimetallic strip could be readily substituted therefor. In this case, the flapper valve normally would be open in cold flow conditions, and closed under normal operating conditions. Of course, a bimetallic flapper valve would still be flexible and provide pressure spike protection even in warm flow conditions. The flapper valve could also be made of other materials, such as plastic, and it could be coated to improve its sealing properties, if desired.

As well, whereas in the preferred embodiments illustrated, the flapper valve is adapted to substantially arrest flow when the free end portion thereof is disposed at its first or closed position, this need not be the case. The free end portion could, for example, be sized to only partially cover the passage, thereby to permit a measure of bypass flow at all times.

In the embodiment shown in FIGS. 2-9 and 11-12, the rivet could be made of a resilient material having preformed heads 64 and 80 and popped or snapped into position after the support structure 54 is brazed to heat exchange element 28.

Finally, the flapper support structure or main body portion 54 could be located or orientated differently on the fluid device to which it is attached. For example, where the oil flow direction is reversed, so that it goes through filter 24 first and then through heat exchange element 28, as mentioned above, flapper valve assembly 20 would be turned upside down, so that flapper valve 52 would open inwardly into a flow passage or manifold in the device. The flapper valve 52 could also be located in an outlet passage or manifold instead of all inlet manifold.

From the foregoing, it will be evident to persons of ordinary skill in the art that the scope of the present invention is limited only by the accompanying claims, purposively construed.

The invention claimed is:

1. A heat exchanger comprising:
a heat exchange element including an inlet manifold, an outlet manifold and a plurality of fluid paths each extending between the inlet manifold and the outlet manifold;
a main body part including: a first plate operatively permanently secured to the heat exchange element and having extending therethrough a valve orifice communicating with one of the inlet manifold and the outlet manifold; and a transverse pin spaced from the valve orifice and extending from the first plate to an enlarged upper head part, the pin being secured to the first plate in a manner such that an unbroken sealing surface of the main body part seals, but for said valve orifice, said one of the inlet manifold and the outlet manifold; and
a flexible flapper valve having: a mounting end portion defining a hole through which the pin extends, the flapper valve being retained in position against the first plate by the enlarged upper head part; a free end portion movable from a first position, where the free end portion at least partially blocks flow through the valve orifice, to a second position spaced from the valve orifice; and bias means for urging the free end portion into the first position.

2. A heat exchanger according to claim 1 wherein the bias means is the flapper valve formed out of spring steel.

3. A heat exchanger according to claim 1 wherein the bias means is the flapper valve formed of bimetallic strip orientated to move to one of the first and second positions under normal heat exchanger operating conditions.

4. A heat exchanger as claimed in claim 1, further comprising a face plate permanently secured to the first plate and adapted for receiving an oil filter.

5. A heat exchanger as claimed in claim 1, wherein the first plate has a bore through which the pin extends and is permanently secured to the heat exchange element by an intermediate second plate which defines the sealing surface and upon which the first plate is disposed in stacked, sealed relation; and the pin has an enlarged lower head part which is mechanically captured in a recess defined between the first plate and the second plate.

6. A heat exchanger according to claim 1, wherein the pin and the first plate are integrally formed of a single piece of material which defines the sealing surface.

7. A heat exchanger according to claim 1, wherein the pin and the first plate are integrally formed of a single piece of material which is permanently secured to the heat exchange element by an intermediate second plate which defines the sealing surface.

8. A heat exchanger according to claim 1, wherein the pin has an axis which extends through said one of the inlet manifold and the outlet manifold.

* * * * *